United States Patent [19]

Taillie et al.

[11] 3,878,195

[45] Apr. 15, 1975

[54] METHOD FOR THE MANUFACTURE OF MUSTARD MUCILAGE

[75] Inventors: Steven A. Taillie; Frank E. Weber, both of Rochester, N.Y.

[73] Assignee: R. T. French Company, Rochester, N.Y.

[22] Filed: Oct. 16, 1973

[21] Appl. No.: 406,789

[52] U.S. Cl. .................................. 260/212; 426/430
[51] Int. Cl. ...................... C08b 15/00; C08b 29/00
[58] Field of Search ...................... 426/430; 260/212

[56] References Cited
UNITED STATES PATENTS

| | | | |
|---|---|---|---|
| 3,044,876 | 7/1962 | Goering | 426/430 |
| 3,168,406 | 2/1965 | Moshy | 426/430 |
| 3,252,807 | 5/1966 | Kuramoto | 426/430 |
| 3,365,440 | 1/1968 | Circle et al. | 426/430 |

FOREIGN PATENTS OR APPLICATIONS

| | | | |
|---|---|---|---|
| 883,836 | 4/1959 | United Kingdom | 426/430 |
| 224,524 | 8/1925 | United Kingdom | 426/430 |

*Primary Examiner*—Ronald W. Griffin
*Attorney, Agent, or Firm*—Shlesinger, Fitzsimmons & Shlesinger

[57] ABSTRACT

This is a three-stage process in which mustard mucilage is extracted from the hulls or bran of yellow mustard seed (*sinapis alba*). In the first, or pre-purification stage, whole bran and a constant boiling azeotrope are placed in a counter-current extractor, which simultaneously extracts free sugars and mustard oil from the bran. In the second stage the purified bran from the first stage is slurried with water at preferably an elevated temperature, and centrifuged, for instance, to separate the aqueous mucilage from the bran, which may then be dried to form animal feed, or other by-products. In the third stage the mustard mucilage is separated from water in the aqueous solution by flash evaporation or by alcohol precipitation, and the concentrated mucilage is then drum or freeze dried.

19 Claims, 3 Drawing Figures

FIG. I

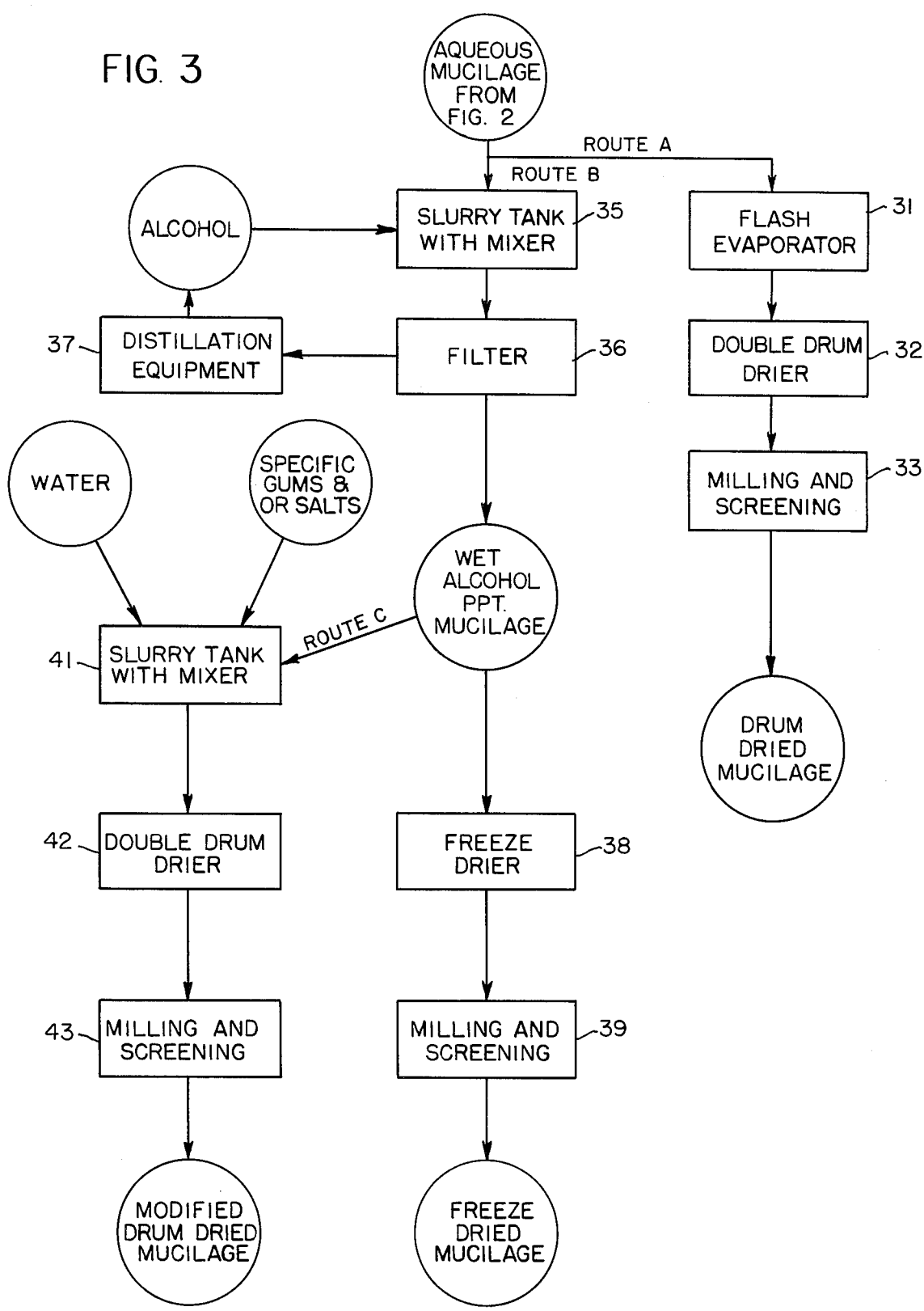

METHOD FOR THE MANUFACTURE OF MUSTARD MUCILAGE

This invention relates to the production of mustard mucilage, and more particularly to a method for extracting the mucilage from the hulls of yellow mustard bran.

Yellow mustard seed has long been recognized by the industry for its emulsification and water binding capacity in the manufacture of prepared mustards and salad dressings.

In 1932, Bailey and Norris published a paper in the Biochemical Journal (26:1909) dealing with the nature and composition of mucilage in the seed of white mustard (*Brassica alba*). They noted that the mucilage of mustard seed consists of a complex of cellulose and acid polysaccharides; that the cellulose may readily be separated by warming with dilute sulfuric acid; that, by addition of barium hydroxide solution to the mucilage solution, a gel and also a soluble fraction composed of rhamnose, arabinose, galactose, and galacturonic acids are obtained; that the gel obtained may be further separated by the action of 4 percent sodium hydroxide into cellulose and a fraction composed of arabinose, galactose, and galacturonic acid and gylcuronic acid on hydrolysis; and that aldobionic acids; probably rhamnose and galactose-galacturonic acids, are present in the mucilage. While this paper disclosed a number of properties of the mucilage of mustard seed, it did not disclose a satisfactory method for manufacturing the mucilage.

Recent efforts to modify the consistency of a mustard sauce with certain commercial gums resulted in apparent incompatibility, and produced gelation and a stringy precipitate in the sauce. This suggested the study of the properties of mustard mucilage.

It is an object of this invention to provide a practical, efficient method for producing mustard mucilage.

Another object of this invention is to provide a method of producing mucilage from yellow mustard bran, which can be practiced on existing equipment.

A further object of this invention is to provide a method of producing mustard mucilage in drum-dried or freeze-dried form.

Other objects of the invention will be apparent hereinafter from the specification and from the recital of the appended claims, particularly when read in conjunction with the accompanying drawings.

In the drawings:

FIG. 3 is a chart which shows three different ways the aqueous mucilage can be treated to produce the desired mustard mucilage.

Figure 1:
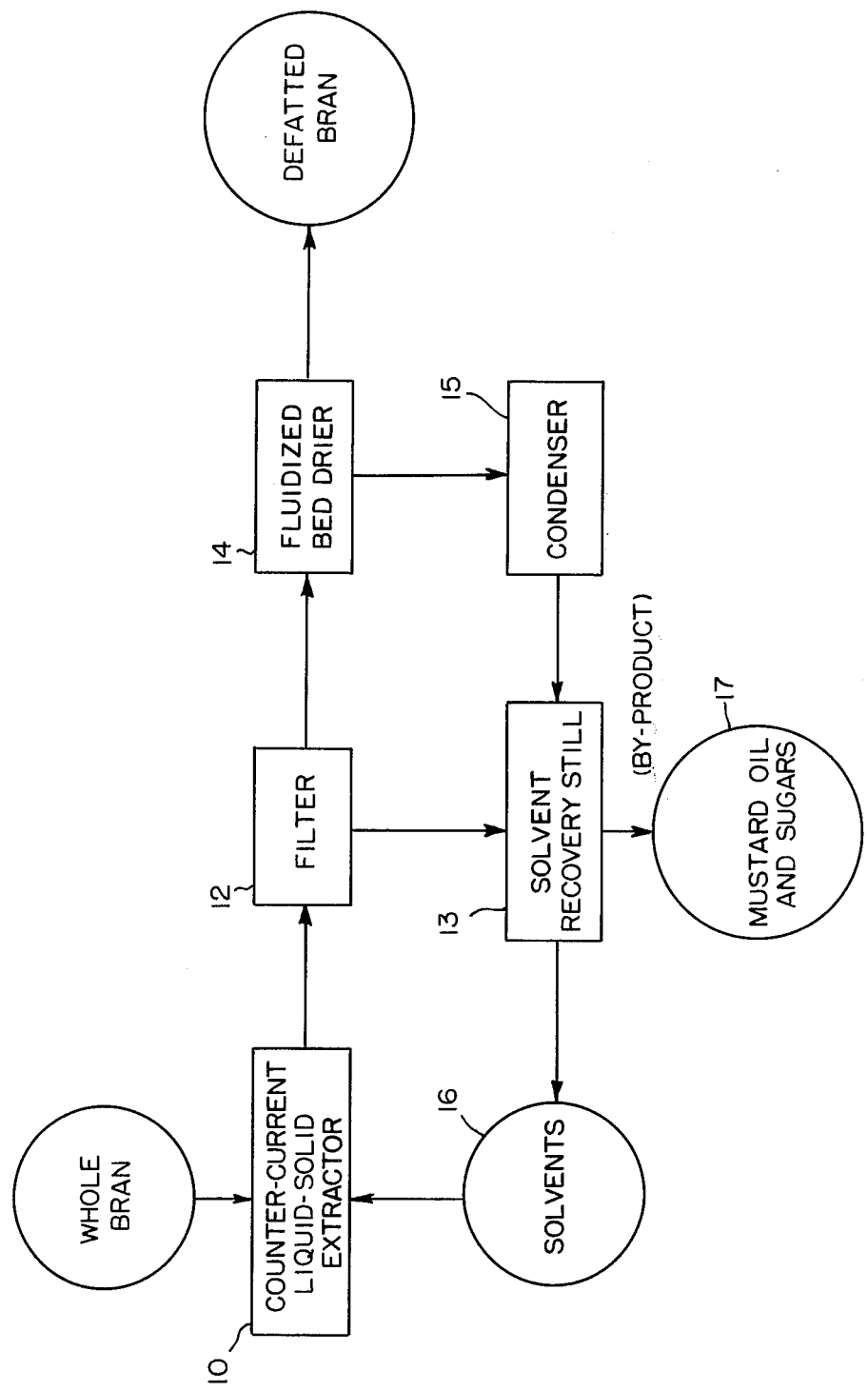
FIG. 1 is a chart showing schematically the various steps required to remove mustard oil and free sugars from the hulls of mustard seed as a first step in the manufacture of mucilage in accordance with one embodiment of this invention.
Figure 2:
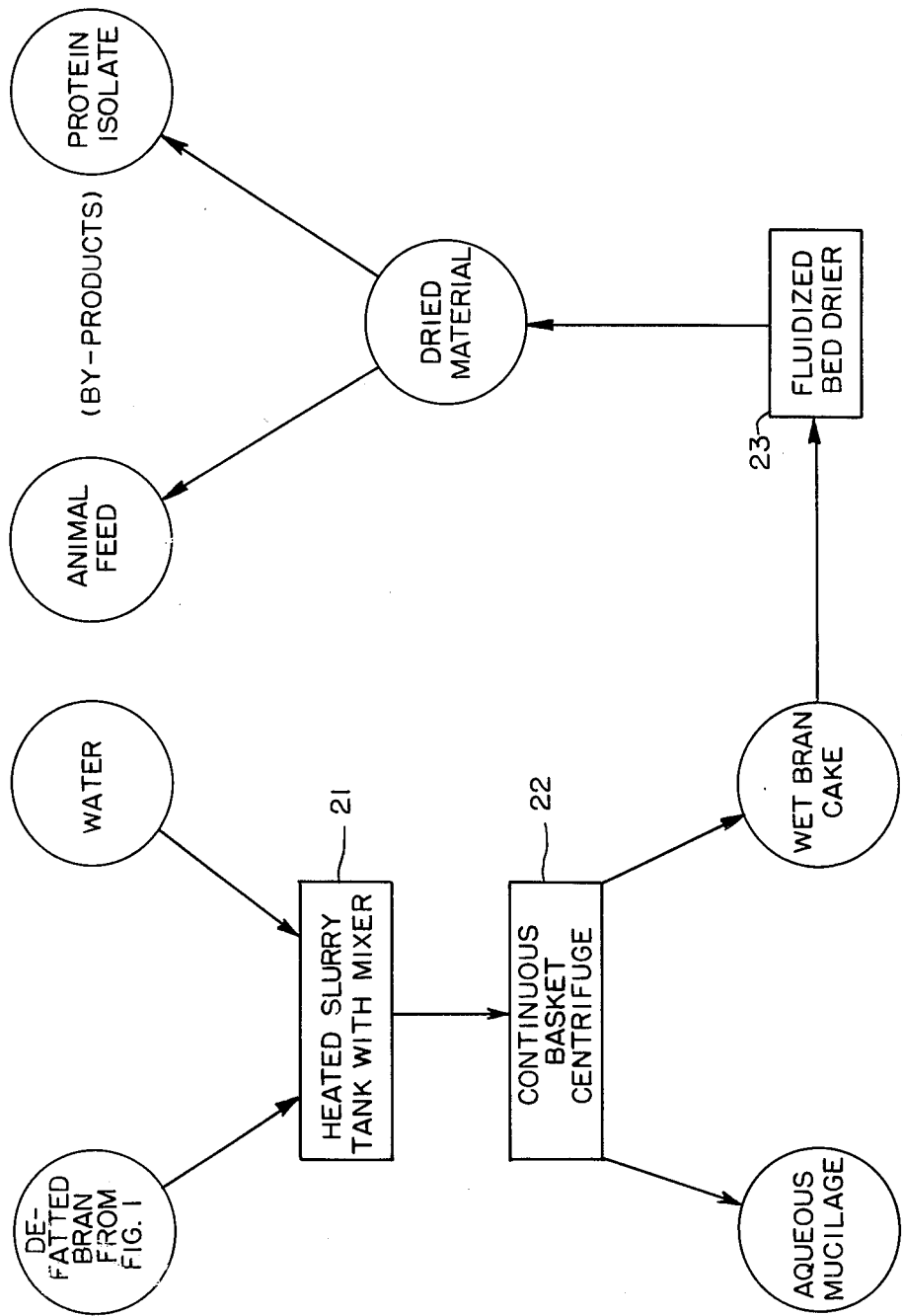
FIG. 2 is a chart showing schematically the next series of steps performed to extract the mucilage from the bran, which may then be made into various by-products.

The manufacture of the mustard mucilage in accordance with this invention requires, in essence, a three-step process as illustrated, for example, in FIGS. 1 to 3 of the drawings.

The first step is the pre-purification of the bran. This is required to remove the mustard oil and free sugars from the bran prior to the extraction of the mustard mucilage. It was first thought that two separate extractions were needed for this; one to remove the mustard oil, and the other to remove the free sugars. It was found, however, that the use of constant boiling azeotropes would remove both the oil and the free sugars simultaneously. Tests have shown that both binary and tertiary azeotropes can be used for this purpose.

The best binary azeotrope, we found was a mixture of 65 percent ethylene dichloride and 35 percent methanol. The best tertiary azeotrope, was a mixture of 85 percent hexane, 12 percent ethanol and 3 percent water. The extraction may be performed either by using a standard extractor or by refluxing the bran in the solvent. It was found that constant boiling azeotropes work best if the bran is refluxed with the solvent. This refluxing improves the efficiency of the fat and free sugar removal and also shortens the extraction time. In commercial production a countercurrent liquid solid extractor 10 (FIG. 1) is used. The output of the extractor is filtered by a filter 12, the liquid passing to a solvent recovery still 13, and the solid to a fluidized bed drier 14. Vapors recovered from the drier 14 are condensed in the condenser 15 and returned to the still 13. The output of still 13 is returned to the solvent supply 16. The liquid by-products of the still is mustard oil which is collected at 17. The dried solids from the drier 14, of course, constitute the defatted bran.

The mustard oil which is produced by this pre-purification of the bran in the first stage of the process, is a valuable by-product which can be sold commercially. The solvent, as noted above, is recovered, redistilled, and used over again to extract more whole bran.

The defatted bran produced in this manner has unique properties over unpurified bran. For example, it has greater viscosities in wet milled applications, and has greater water absorption than non-solvent extracted bran.

FIG. 2 illustrates the stage in which the mucilage is separated from the bran. This is accomplished by slurrying the defatted bran from the first stage with water. The ratios of one part bran to fifteen to forty parts of water were explored. It was found that a ratio of one part bran to twenty parts water is best. The bran was extracted in both acidic, neutral, and basic aqueous solutions. It was found that a neutral pH of around 6.8 to 7.2 is best.

The cooler the water extraction temperature, the longer the extraction time required. At room temperatures (approximately 25°C) upwards of twenty-four hours are required to completely remove all of the mucilage from the hulls of the bran. As the temperature of the water is increased, the length of the extraction time decreases until a temperature of 60° to 70°C is reached. One hour at this temperature gives good yields with good final viscosities. Temperatures higher than 70°C give higher yields, but the final viscosities of the aqueous mucilage are undesirably low. This is probably due to the auto-hydrolysis of polysaccharides at boiling water temperatures.

It has been discovered also that the solubility of the aqueous mucilage produced by the second stage (FIG. 2) can be increased by adding a surfactant to the extraction water. For example, dioctyl sodium sulfosuccinate (DDS) used at levels of 500 to 5,000 parts per million in the extraction water increased the final viscosities of the freeze dried mucilage. For best results, the surfactant should be maintained at a level of approximately 0.1 percent, or 1,000 parts per million of extraction water.

After this extraction step, the aqueous slurry is either passed into a continuous basket centrifuge 22 (FIG. 2), or, alternatively, a Langsenkamp pulper finisher. Either piece of equipment will provide a physical separation of the aqueous mucilage from the wet bran. The wet bran can then be either re-extracted in water to yield a second, lower crop of mucilage, or, as shown in FIG. 2, it can be transferred to a fluidized bed drier 23, which yields a dried material, which as a by-product of the operation can be used for animal feed, or as a starting material for manufacturing, for example, a protein isolate.

Referring now to FIG. 3, which illustrates the third stage of the process, the drying of the mucilage, we have three possible routes, denoted in FIG. 3 as routes A, B, and C, respectively.

In route A, the aqueous mucilage is passed through a flash evaporator 31 (FIG. 3) to concentrate the product and elevate its solid content. From the evaporator the concentrated product is sent to a double-drum dryer 32, the output of which is transferred to milling and screening apparatus 33, which produces the final product — i.e., drum-dried mucilage. Mucilage produced in this fashion, however, is inferior to mucilage dried by other means because it incorporates a higher nitrogen and total ash content due to the co-drying of inorganic salts and water soluble proteins. This dried product also requires greater heating, or the use of high shear for the mucilage to rehydrate.

In route B, both the inorganic salts and water soluble proteins are removed from the mucilage before drying. This is accomplished by an alcohol precipitation of the mucilage from the water. Methyl, ethyl, and isopropyl alcohols have been tried, but ethyl alcohol has been found to be most effective. The aqueous mucilage and ethyl alcohol in the ratio of one part mucilage to two parts alcohol may be mixed in a tank 35 (FIG. 3). The mucilage can be precipitated out of solution at a one to one ratio, but it has been found that a one to two ratio is more effective and brings more of the mucilage out of solution.

After the mucilage has been precipitated out of solution, it is physically separated from the water alcohol mixture by passing it over a vacuum filter 36. The water alcohol mixture is then distilled in distillation equipment 37, which recovers the alcohol from the liquid for reuse in further precipitations.

The wet alcohol precipitated mucilage is then freeze-dried in any conventional manner, and then subjected to a milling and screening operation 39 to produce a freeze-dried mucilage that has a lower ash content than in method A, and which also has a lower nitrogen content. Moreover, it has better final viscosities than the drum-dried mucilage produced by method A, and it also will rehydrate more readily than the drum-dried mucilage.

Instead of passing the wet alcohol-precipitated mucilage 37 from filter 30 to the vacuum drier 38, the wet alcohol-precipitated mucilage may be redissolved in water according to route C, and simultaneously mixed with selected gums and/or salts in a slurry tank 41 to change the properties of the mucilage. This slurry is then dried on a double-drum drier 42, milled and screened by milling and screening apparatus 43 to obtain a modified drum-dried mucilage. It has been found that with this last described method of manufacture the mucilage has a synergistic effect with other gums such as guar, locust bean, and carboxymethylcellulose (CMC). The synergistic effect or increase in viscosity is quite dramatic with these gums and mustard mucilage.

The mucilage produced gy the above-noted processes is a low to medium viscosity thixotropic hydrocolloid. A 1 percent solution can bring a viscosity range of 400 to 700 cps depending upon extraction conditions. The dried mucilage is a cold water swellable gum; and mild heating (132° to 150°F) is required for a complete solubility, or the use of a high shear mixer.

The solution's viscosity will increase rapidly with the addition of alkali or acids. No effect is noted by addition of alkaline earth ions to solutions of the mucilage. Solutions of the mucilage form gels or precipitates upon the addition of aluminum, copper, lead, iron and tin ions. The pH of a 1 percent solution of mucilage is 6.85 to 6.9. Titration of the mucilage with 0.5 N hydrochloric acid reveals an inflection point at a pH of 3.3 to 3.0 indicating that the mucilage in its natural state is a salt of uronic acid. Chemical analysis of mustard mucilage indicates the presence of inorganic salts that seem to be bound with the structure of the mucilage.

As noted earlier, synergistic increases of viscosity are noted when solutions of mustard mucilage were mixed with solutions of either guar gum, locust bean gum, or CMC. For example, while a 1 percent solution of mucilage has the viscosity of 400 to 600 cps and a 1 percent solution of guar has a viscosity of 1,600 cps, a 1 percent solution of three parts of mustard mucilage to seven parts guar gum has a viscosity of over 19,000 cps as measured by a Brookfield Viscometer.

The mucilage not only lowers the surface tension of water and the interfacial tensions between oil and water, but it also functions generally as an excellent emulsifier. For example, a 1 percent or lower level of mustard mucilage in conjuction with gums such as guar, locust bean or CMC form very stable emulsions in either 60 percent oil, and 40 percent water or 60 percent water and 40 percent oil. Emulsification has been achieved, for instance in salad dressing formulations. The mucilage in aqueous solutions at 0.25–1 percent also exhibits excellent suspending properties which are not dependent on viscosity, since suspensions prepared using some higher viscosity hydrocolloids, for instance carboxymethylcellulose, settle out of solution on standing.

From the foregoing it will be apparent that the method disclosed herein provides an efficient process for extracting mucilage from the hulls or bran of yellow mustard seeds, in addition to providing a number of commercially vendable by-products, such as mustard oil, and animal feed. The kernel of the mustard seed, which is used for producing ordinary table mustard, has long found a commercial market, while the hulls or bran surrounding the kernel has not heretofore been considered of much commercial value. The method disclosed herein will now permit processing of the mustard hulls on a commercially feasible basis to produce a mustard mucilage which has a wide variety of uses.

Having thus described our invention, what we claim is:

1. The method of preparing mustard mucilage, comprising defatting whole yellow mustard bran by extracting mustard oil and free sugar from the whole bran, mixing water with the defatted bran to form an aqueous slurry having a neutral pH in the approximate range of 6.8 to 7.2, maintaining said aqueous slurry for a predetermined interval at an elevated temperature not exceeding 70° Centigrade, separating the heated slurry after said interval into a wet bran cake and aqueous mucilage, and drying said aqueous mucilage.

2. The method as defined in claim 1, including mixing said whole bran with a constant boiling azeotrope simultaneously to extract said mustard oil and said sugars from the whole bran.

3. The method as defined in claim 2, wherein said azeotrope is a mixture comprising ethylene dichloride and methanol.

4. The method as defined in claim 2, wherein said azeotrope is a mixture comprising hexane, ethanol, and water.

5. The method as defined in claim 1, wherein after the extraction of oil and sugars from the whole bran, water and said defatted bran are mixed in the ratios of approximately twenty to one, respectively, to form said aqueous slurry.

6. The method as defined in claim 5, wherein said aqueous slurry is heated for approximately one hour at a temperature of between approximately 60° to 70° Centigrade before being separated into said bran cake and aqueous mucilage.

7. The method as defined in claim 5, wherein the water added to said bran includes a small quantity of a surfactant.

8. The method as defined in claim 1, including passing said aqueous mucilage through a flash evaporator to concentrate the mucilage before drying it.

9. The method as defined in claim 1, including mixing the aqueous mucilage with an alcohol to precipitate the mucilage from the water in the mixture before drying the mucilage.

10. The method as defined in claim 9, wherein the mucilage precipitated out by said alcohol is slurried with a gum before being dried.

11. The method of preparing mustard mucilage which comprises defatting the bran of yellow mustard seed hulls by refluxing the bran with a constant boiling azeotrope to prepurify the bran and produce mustard oil, separating the mustard oil from the defatted bran, slurrying the defatted bran with water at an elevated temperature not exceeding approximately 70° Centigrade to effect separation of mucilage from the bran, precipitating the mucilage from the water with alcohol, and drying the mucilage.

12. The method according to claim 11, wherein the azeotrope is selected from the group consisting of a mixture of ethylene dichloride and methanol and a mixture of hexane, ethanol and water.

13. The method according to claim 11, wherein in separating mucilage from the defatted bran water is used in a ratio of twenty parts water to one part bran and at a pH of 6.8 to 7.2.

14. The method according to claim 13, wherein a surfactant is used in the extraction water.

15. The method according to claim 14, wherein the surfactant is dioctyl sodium sulfosuccinate and is used at a level of 500 to 5,000 parts per million in the extraction water.

16. The method according to claim 11, wherein the wet bran separated from the mucilage is dried for further use.

17. The method according to claim 11, wherein the wet bran separated from the mucilage is re-extracted in water to yield a second lower crop of mucilage.

18. The method according to claim 11, wherein the alcohol used in precipitating the mucilage from water is ethyl alcohol and is employed in a ratio of two parts of alcohol to one part of mucilage.

19. The method according to claim 11, wherein after precipitation of the mucilage from solution it is physically separated from the water-alcohol mixture, and is then freeze-dried, milled and screened.

* * * * *